United States Patent Office.

JOHN F. COLLINS, OF NEW YORK, N. Y.

Letters Patent No. 60,835, dated January 1, 1867.

---

IMPROVEMENT IN THE MANUFACTURE OF ALCOHOL AND OTHER PURE DISTILLATES.

---

The Schedule referred to in these Letters Patent and making part of the same.

---

TO ALL WHOM IT MAY CONCERN:

Be it known that I, JOHN F. COLLINS, of New York, in the county of New York, and State of New York, have invented a new and useful Improvement in the Manufacture and Production of Alcohol and other Spirits, from wash, mash or other substances, or for raising the proof of distilled spirits; and I do hereby declare that the following is a full and exact description thereof, which will enable those skilled in the art to practise and use the same.

My invention relates to the manufacture and production of alcohol and other spirits and volatile substances which are obtained by distillation; and it consists in several particulars as hereinafter set forth In heating the wash, mash or other substances, from which alcohol or other spirits are to be distilled, I add to the wash, mash, or other substances, a suitable quantity of phosphate of lime, or its equivalent, for the purpose of counteracting the generation or formation of acids, and for the purpose of neutralizing any acids that may have been formed. Soda or carbonate of ammonia can be substituted for the phosphate of lime, if preferred. Another part of my invention consists in conducting the distillation of spirituous solutions at a temperature not exceeding 176° Fahrenheit, for the purpose of preventing the formation of acetous and acetic acids in the mass. Another part of my invention consists in the use and application of a current of some suitable and not deleterious gas to propel the alcoholic or spirituous vapors, or volatile distillates, and drive them from the still, instead of using heat. The gas is introduced into the still through a pipe or pipes, and expels the vapors by pressure and mechanical action, in the following manner: The pipe is carried perpendicular from the top of the still to any desired height, greater or less than a column of water at the natural pressure of the atmosphere, as circumstances may require. It is then bent downward, and extended in that direction to the condenser, and by means of a similar pipe between the condenser and the still, the circuit is made complete; the purpose of the perpendicular pipe being, also, to return any aqueous vapors that may arise directly back to the still. The said perpendicular pipe may also be made to communicate with the condenser by means of branch pipes from any desired point in its ascent, when it is required to vary the gravity of the different distillates; the result of the foregoing-described process being to secure more economical and perfect distillation, as well as securing distillates of greater commercial value, being purer of their kind, and free from extraneous substances. It is not necessary to illustrate the same by drawings, because the form and use of such pipes, between the still and condenser, and the maintaining of a circulating current thereby, are within the compass of the skill of any person conversant with the art.

Having thus described my invention, what I claim as new, and desire to secure by Letters Patent, is—

1. The products derived from hydro-carbon, coal, or mineral oils, petroleum, or turpentine distilled, substantially as described.

2. Spirituous liquors, alcoholic substances, and essential oils, distilled from wash, mash, or other substances, in the manner substantially as described and set forth.

In testimony whereof I have hereunto set my signature.

JOHN F. COLLINS.

Witnesses:
    A. NEILL,
    E. PLANTA.